United States Patent [19]

White et al.

[11] Patent Number: 4,755,957

[45] Date of Patent: Jul. 5, 1988

[54] AUTOMOTIVE AIR-CONDITIONING SERVICING SYSTEM AND METHOD

[75] Inventors: Daniel White, Indianapolis; John Hancock, Carmel, both of Ind.

[73] Assignee: K-White Tools, Incorporated, Indianapolis, Ind.

[21] Appl. No.: 884,541

[22] Filed: Mar. 27, 1986

[51] Int. Cl.$^4$ ............................................. F25B 45/00
[52] U.S. Cl. .................................... 364/551; 62/126; 62/129; 62/149
[58] Field of Search ....................... 364/551, 557, 558; 62/126, 149, 129; 165/11.1, 41, 42

[56] References Cited

U.S. PATENT DOCUMENTS

| | | | |
|---|---|---|---|
| 3,873,289 | 3/1975 | White | 62/149 |
| 4,114,448 | 9/1978 | Merritt | 62/129 |
| 4,285,206 | 8/1981 | Koser | 62/126 |
| 4,325,223 | 4/1982 | Cantley | 62/126 |
| 4,381,549 | 4/1983 | Stamp, Jr. et al. | 364/557 |
| 4,6214,112 | 11/1986 | Proctor | 62/149 |

OTHER PUBLICATIONS

Brochure entitled "Auto Air Service Center Operator's Manual".
Brochure entitled "Could Your Business Stand an Increase in Its Profit Potential", describing the Model 01016 Auto Air Service Center III, White Industries.
Brochure entitled "Automatic Air Conditioning Service Station"-Robinair Division-Sealed Power Corporation.
Brochure entitled "Automotive Air Conditioning Service Center Draf Hi-Tech 1250" Draf Industries, Inc.
Brochure entitled "Automotive Test Equipment Catalog Instruments of the Eighties", TIF Industries, Inc.
Training Manual, Automotive Air-Conditioning Basic Service, 1985 Edition, pp. 115-139, White Industries, Inc.

Primary Examiner—Parshotam S. Lall
Assistant Examiner—Thomas G. Black
Attorney, Agent, or Firm—Willian Brinks Olds Hofer Gilson & Lione

[57] ABSTRACT

Method and apparatus for servicing air-conditioning systems employing electronic processing means for initially diagnosing the air-conditioning system and, thereafter, if tests or repairs are needed, for guiding the mechanic to correction of its defective operation and for charging the system with refrigerant and oil. The apparatus, according to a preferred embodiment, includes a microprocessor operable in three modes: a "system selection" mode during which the type of system being serviced is identified; a "diagnose" mode during which the microprocessor receives signals indicative of the high and low side pressures of the air-conditioning system and develops a list of possible causes of system malfunction, and a "charging" mode during which the microprocessor automatically charges the system with the desired amount of refrigerant and oil. The apparatus further includes means controlled by the microprocessor for automatically compensating for changes in the viscosity and temperature and, hence, of the flow rate of the oil to ensure the air-conditioning system will always be correctly filled. The invention permits accurate diagnosis and repair to be carried out by relatively inexperienced personnel in a straightforward, efficient manner.

27 Claims, 7 Drawing Sheets

AUTOMOTIVE AIR-CONDITIONING SERVICING SYSTEM AND METHOD

BACKGROUND OF THE INVENTION

The present invention relates generally to a method and apparatus for servicing air-conditioning systems and, more particularly, to a method and apparatus for testing, diagnosing, and repairing automotive air-conditioning systems.

It is estimated that more than 85 million passenger cars currently on the road in the United States are equipped with air-conditioning systems. In addition, trucks, vans, motor homes, and other vehicles are air-conditioned.

Several air-conditioner "service units" are available to assist a mechanic in servicing these vast numbers of air-conditioning systems, and one such service unit is described in commonly assigned U.S. Pat. No. 3,873,289. This unit is adapted to be connected to the high- and low-pressure sides of an automotive air-conditioning system and includes apparatus for measuring the high and low side pressures of the system, for draining and evacuating the system and for charging the system with refrigerant and lubricating oil.

When servicing an air-conditioning system with a service unit such as described in U.S. Pat. No. 3,873,289, the high and low side pressures of the system are first measured under appropriate operating conditions. These measured values are then compared with known standards for the particular air-conditioning system being tested; and from this comparison and other observable characteristics of the system, the mechanic decides whether or not the system is operating properly. If a system malfunction is indicated, the mechanic also determines the possible causes of the malfunction and decides how the system should be repaired. Depending on the type of repairs to be made, the service unit may then be used to either drain or evacuate the system or both drain and evacuate the system, to add to the system either refrigerant or lubricating oil, or both refrigerant and oil, as needed.

When using prior service units, the determination of whether or not an air-conditioning system is operating properly, the diagnosis of the possible causes of an improperly operating system, and the corrections needed to repair the system are essentially all made by a mechanic. Thus, accurate diagnosis and repair require that the mechanic possess substantial expertise. Many mechanics, however, service air-conditioning systems only occasionally as one aspect of providing general automotive repair services and do not have sufficient experience in servicing the various types of air-conditioning systems to be able to consistently service the systems in the most effective manner. Accordingly, with prior service units, misdiagnosis can frequently occur, resulting in improperly repaired systems and in excessive time consumption to complete the repairs.

Although service manuals are available to assist the mechanic in diagnosing and repairing air-conditioning systems, their use is time-consuming and inefficient. They also occupy valuable space and must be kept up to date.

Another inadequacy of many prior service units is that when using the unit to charge an air-conditioning system with oil, the mechanic must take special care to ensure that the system is properly charged because an improperly charged system will not operate satisfactorily. In some systems, it is necessary for the mechanic to adjust the charging time to compensate for variations in the viscosity of the oil due to variations in the oil temperature. In other systems, the weight of the oil source must be monitored by a digital scale or the like to ensure a proper charge.

In general, although prior service units provided the important advantage of placing much of the equipment needed to service an automotive air-conditioning system together in one cabinet, the basic steps of testing, diagnosing, and repairing the air-conditioning system still had to be performed by the mechanic.

SUMMARY OF THE INVENTION

The present invention relates to a method and apparatus for servicing air-conditioning systems employing electronic processing means for initially diagnosing the air-conditioning system and, thereafter, if tests or repairs are needed, for guiding the mechanic to correction of its defective operation and for charging the air-conditioning system with refrigerant and oil.

According to a presently preferred embodiment, the apparatus includes a microprocessor which is programmed to operate in three modes: a "system selection" mode during which the mechanic identifies the type of air-conditioning system being serviced, a "diagnose" mode during which the microprocessor receives signals indicative of the high and low side pressure of the air-conditioning system and develops a list of possible defective components and other causes of system malfunction, and a "charging" mode during which the microprocessor automatically charges the system with the desired amount of refrigerant and/or oil.

During operation in the diagnose mode, the high and low side pressures of the air-conditioning system are measured by transducers under appropriate operating conditions of the system. These transducer measurements are converted by analog to digital converters to digital electrical signals capable of being received by the microprocessor. The microprocessor analyzes these digital signals by comparing the signal values with programmed standards for the type of air-conditioning system being tested and produces, preferably, a CRT output, indicating whether or not the air-conditioning system is operating properly and, if not, the possible causes of the system malfunction. In addition, the microprocessor may produce a display that identifies possibly defective components and further tests that may be performed and outlines the procedure to be followed in repairing the air-conditioning system. Thus, the important diagnostic steps are performed by the system of this invention, eliminating many causes of error in diagnosing malfunctions in the operation of automotive air-conditioning systems.

When the repairs or tests require charging the air-conditioning system with refrigerant or oil, the microprocessor is placed in a charging mode. The mechanic needs only to set the amount of oil or refrigerant needed, and the microprocessor will automatically ensure that the system is filled with the proper amount regardless of the ambient temperature. For example, in charging the system with oil, the apparatus includes means controlled by the microprocessor for automatically compensating for changes in the viscosity and temperature and, hence, the flow rate of the oil to ensure that the air-conditioning system will be correctly filled.

The apparatus of the present invention comprises an integrated service unit which includes means for measuring the high and low side pressures of an air-conditioning system; means for draining, evacuating, and charging the system; means such as a CRT for communicating with the mechanic; and data storage and microprocessor means coupled to said pressure-measuring means and said charging means for diagnosing the air-conditioning system and accurately charging the system with refrigerant or oil when required. In addition, the apparatus includes means for monitoring the level of refrigerant and oil in their respective storage containers, and for both advising the mechanic when replacement of one of the storage containers is required, and for placing a charging operation on "hold" to prevent the air-conditioning system from being improperly charged.

The apparatus permits accurate diagnosis and repair to be carried out by relatively inexperienced personnel in a straight-forward, efficient manner without using service manuals or other reference material. The apparatus is easy to operate, having only five buttons to communicate with the microprocessor and to control all operations of the apparatus.

Further advantages and specific details of the invention will be set forth hereinafter in the following detailed description of the presently preferred embodiment taken in conjunction with the drawings.

BRIEF DESCRIPTION OF THE DRAWINGS

FIG. 3 schematically illustrates a wiring diagram of the service unit of FIG. 1 according to a presently preferred embodiment;

DETAILED DESCRIPTION OF THE PREFERRED EMBODIMENTS

Figure 1:
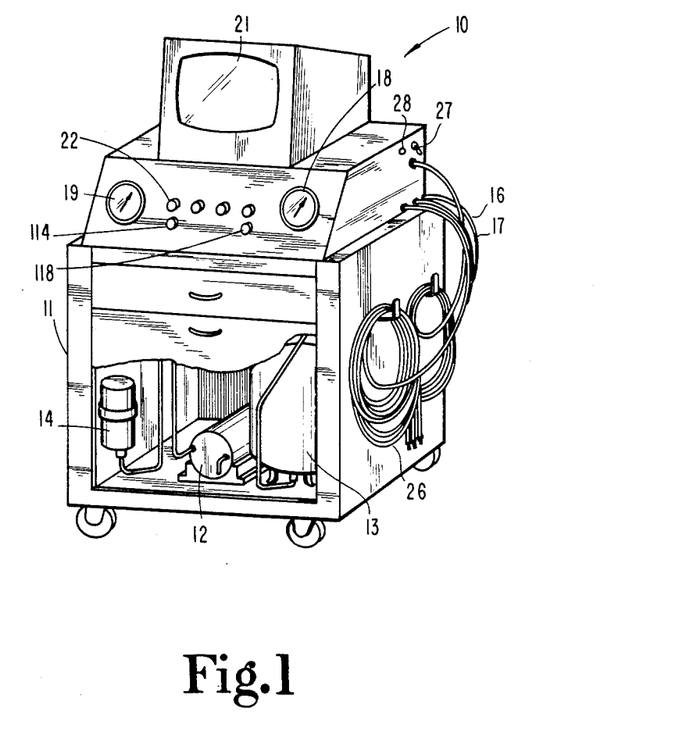
FIG. 1 illustrates an air-conditioning service unit according to a presently preferred embodiment of the invention.

FIG. 1 illustrates an automotive air-conditioning servicing apparatus according to a presently preferred embodiment of the invention. The apparatus is generally designated by reference numeral 10 and comprises a cabinet 11 which supports all components of the apparatus in a substantially portable, selfcontained unit.

A pair of hoses 16 and 17 is mounted on the side of cabinet 11 and is provided to connect the apparatus 10 to the high- and low-pressure sides, respectively, of an air-conditioning system to be serviced. For ease in connection, the hoses are preferably of different colors, e.g., red and blue, respectively.

Contained within the cabinet 11 are: a vacuum pump 12; a pressurized refrigerant supply tank 13; a pressurized oil supply tank 14, together with appropriate pipes or other fluid lines for connecting those components to the hoses 16 and/or 17; and various valves and other components for controlling and monitoring their use in servicing the air-conditioning system, as will be described more fully hereinafter. The cabinet also contains a pair of pressure gauges 18 and 19 connected to hoses 16 and 17 for measuring the high and low side pressures, respectively, of the air-conditioning system.

The upper portion of cabinet 11 also contains a data storage means, a microprocessor and associated circuitry for diagnosing the air-conditioning system being serviced and for charging the air-conditioning system with refrigerant and/or oil when required during testing and repair of the system. Unit 10 also contains a CRT output 21 for communicating with the mechanic and displaying information and data from the data storage means and microprocessor. A series of control buttons 22, including DIAGNOSE 171, CHARGE 172, UP/YES 173, DOWN/NO 174, and SET 175 (FIGS. 4 and 5) are provided adjacent output screen 21 to permit control of the operation of the apparatus 10 and to permit the mechanic to communicate with the microprocessor.

The servicing apparatus 10 is operated directly from a 110 volt a.c., single-phase, electrical service provided through a power cord 26 and controlled by an on/off switch 27. A warning light 28 is coupled to switch 27 to indicate when the apparatus is turned on.

Figure 2:
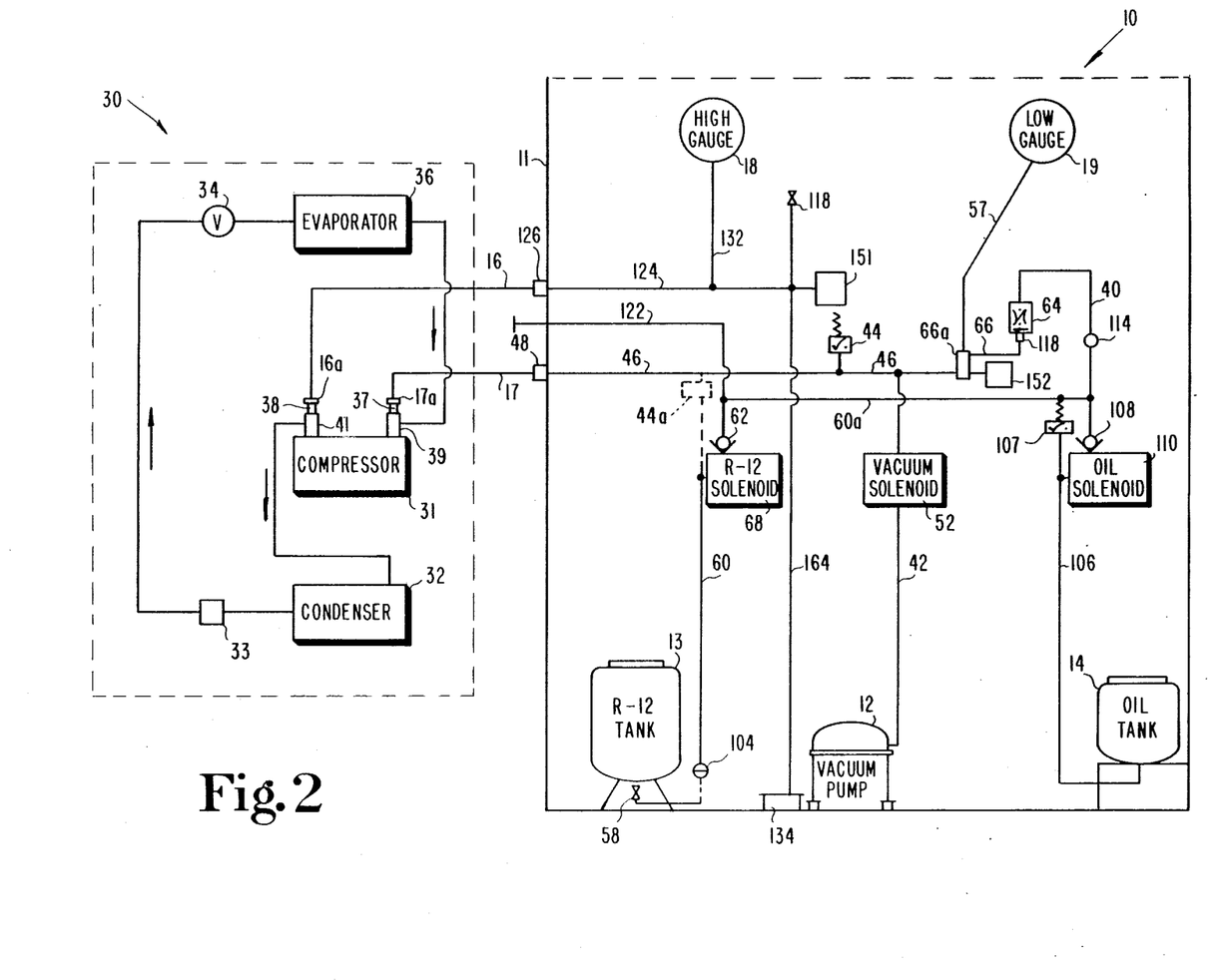
FIG. 2 schematically illustrates a plumbing diagram of the service unit of FIG. 1 according to a presently preferred embodiment coupled to an automotive air-conditioning system.

FIG. 2 is a schematic plumbing diagram of the servicing apparatus 10 of FIG. 1 connected to a typical automotive air-conditioning system generally designated by reference numeral 30; and FIG. 3 is a schematic wiring diagram of the apparatus. System 30 comprises a closed and pressurized system containing a refrigerant such as that known as R-12, which is sold by the Du Pont Corporation under the trademark FREON 12.

The air-conditioning system includes a compressor 31 which compresses refrigerant gas and delivers it to a condenser 32 where the gas is converted into a liquid. The condenser discharges through a sight glass 33 which provides visual observation of the fill level of refrigerant in the system during operation. The sight glass 33 normally also includes a reservoir for storing liquid refrigerant under conditions of large load fluctuations on the system, and includes a high-pressure filter and desiccant to trap and hold any moisture or solid particles which may be present in the system. From the sight glass 33, the refrigerant is delivered through an expansion valve 34 to an evaporator 36 where the refrigerant is evaporated into gaseous form as the system provides cooling in a well-known manner. From the evaporator 36, the refrigerant gas returns to the compressor 31.

For purposes of initially charging the system 30 and for periodically servicing the system with refrigerant and lubricating oil, the compressor 31 has a pair of valve nipples 37 and 38, one located at or near its low-pressure suction port 39 and the other located at its high-pressure discharge port 41. These nipples 37 and 38 provide connections for pressure gauge readings and for the addition of refrigerant and lubricating oil at either the discharge port 41 or the suction port 39 of the compressor.

In the system illustrated in FIG. 2, charging of the air-conditioning system with oil or refrigerant is accomplished through hose 17 connected to the low-pressure side of the system. The low-pressure section of the servicing apparatus 10 comprises the hose 17 having a coupling 17a at its end that is adapted to be connected to the valved nipple 37 at the low-pressure port 39 of the compressor. Coupling 17a preferably includes a normally closed check valve which is opened upon connection to valve nipple 37 on the low-pressure side of the compressor.

Hose 17 is connected through a nipple 48 at the side of the cabinet 11 to a line 46 which, via appropriate connections, connects the hose 17 to the vacuum pump 12, refrigerant supply tank 13, oil supply tank 14, and low-pressure gauge 19. The nipple 48 preferably contains a normally closed check valve which is opened by the hose coupling when it is connected to the hose. As shown in FIG. 2, line 46 is connected to line 57 leading to low-pressure gauge 19, which will continuously register the pressure at the low-pressure port 39 when the hose 17 is connected to the valved nipple 37. Line 46 is also connected to a vacuum solenoid valve 52 in a vacuum line 42 leading to the vacuum pump 12.

Figure 3A:
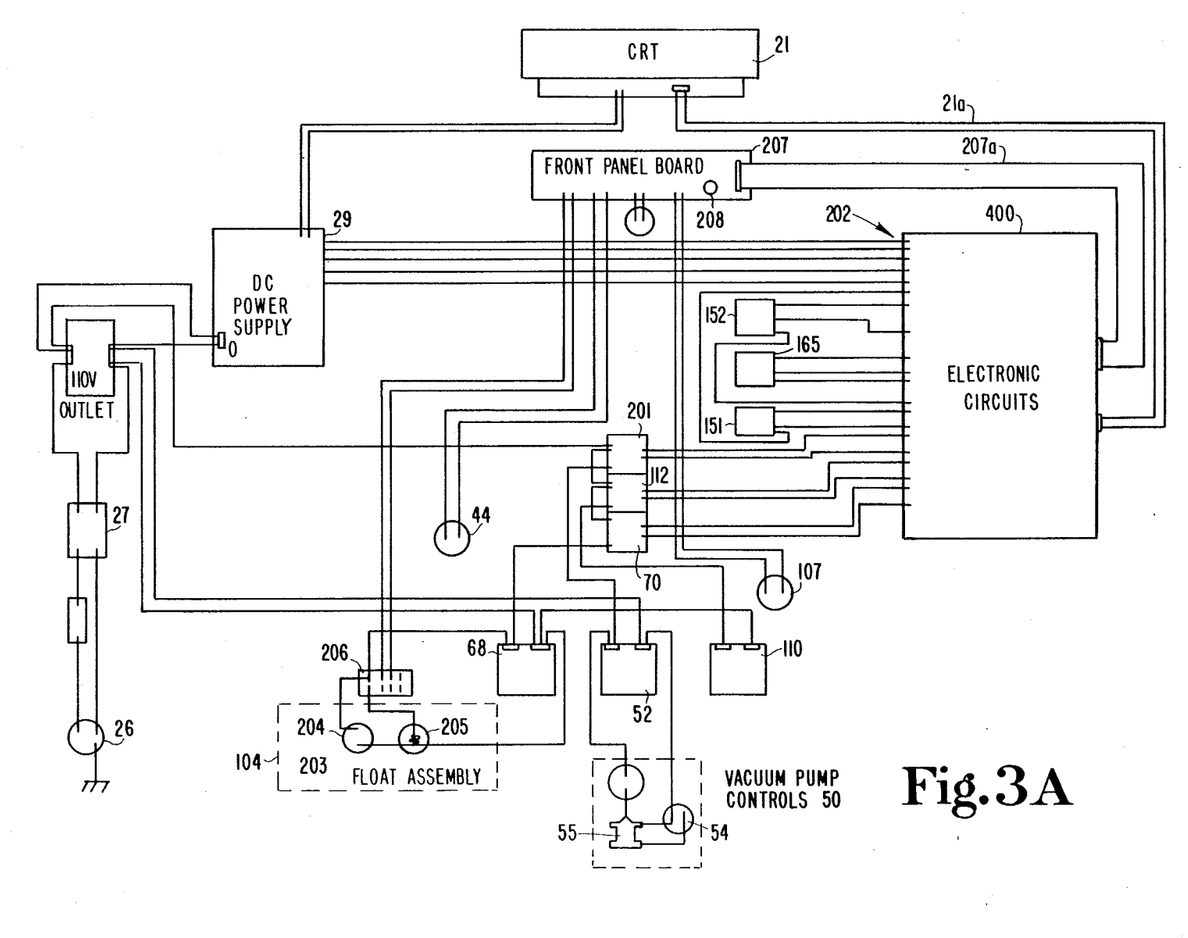
FIG. 3A diagrammatically illustrates the electrical interconnection of the service unit of FIG. 1 according to a presently preferred embodiment.

FIG. 3A is a diagrammatic illustration of the electrical interconnection of the system. As indicated in FIG. 3A, system power is provided from the DC power supply 29 directly to the cathode-ray tube 21 and to the electronic circuits 400 through printed circuit board edge connections, diagrammatically indicated as 202. The electronic circuits are preferably carried on two printed circuit boards: one for the microprocessor, memories, and associated circuits; and the other circuit board for the necessary amplifiers, analog to digital connectors, inverters, and buffers, port controller, and the cathode-ray tube circuitry. The front panel is connected to the electronic circuits with a nine-conductor, ribbon cable 207a; and the electronic circuits are connected with the CRT with a four-conductor, ribbon cable 21a.

As shown in FIG. 3A, the vacuum pump 12 includes vacuum pump controls 50 which control operation of the vacuum pump motor 55 in a circuit controlled by relay 201. Relay 201 is operated by an output signal of the microprocessor 158a via lines connected to the edge connector 202 for the input/output terminals of the microprocessor. The output signal can actuate the 12 vacuum solenoid valve 52 and vacuum pump for selected predetermined time periods or for appropriate periods of time calculated by the microprocessor.

Line 46 is also connected by tubing 66 to a constant flow valve 64 which, in turn, is connected to both a refrigerant supply line 60, 60a and an oil supply line 106. The refrigerant supply line 60, 60a leads to the pressurized refrigerant supply tank 13 and contains a number of controls. The tank 13 itself has a manual shutoff valve 58 for closing the tank when it is disconnected from the line 60, 60a as for replacement. The line 60 contains a check valve 62 which is normally closed in the direction of flow toward the supply tank 13 to prevent any possibility of back flow from the compressor or the oil supply line to the refrigerant supply tank. The line 60, 60a is also connected to a normally closed refrigerant solenoid valve 68. Refrigerant solenoid 68 is controlled by a relay 70 operated by an output signal of the microprocessor 158a as shown in FIG. 3.

The refrigerant supply line 60 also includes a float switch assembly 104 for monitoring the level of refrigerant in tank 13. Float switch assembly 104 is arranged to close that refrigerant supply line when the pressurized refrigerant supply is exhausted and the refrigerant supply falls below an amount necessary to charge the air-conditioning system. Float switch assembly 104 comprises a switch 203 which is sensitive to the level of refrigerant in tank 13. When the refrigerant supply drops below a predetermined level, switch 203 closes to actuate float switch relay 206. Actuation of relay 206 closes a circuit which enables an alarm 208 mounted to the front panel board 207 of the cabinet 11 to signal the mechanic that the refrigerant tank is depleted and requires replacement. At the same time, the microprocessor 158a places the system on "hold" to prevent further charging of the air-conditioning system.

Figure 3B:
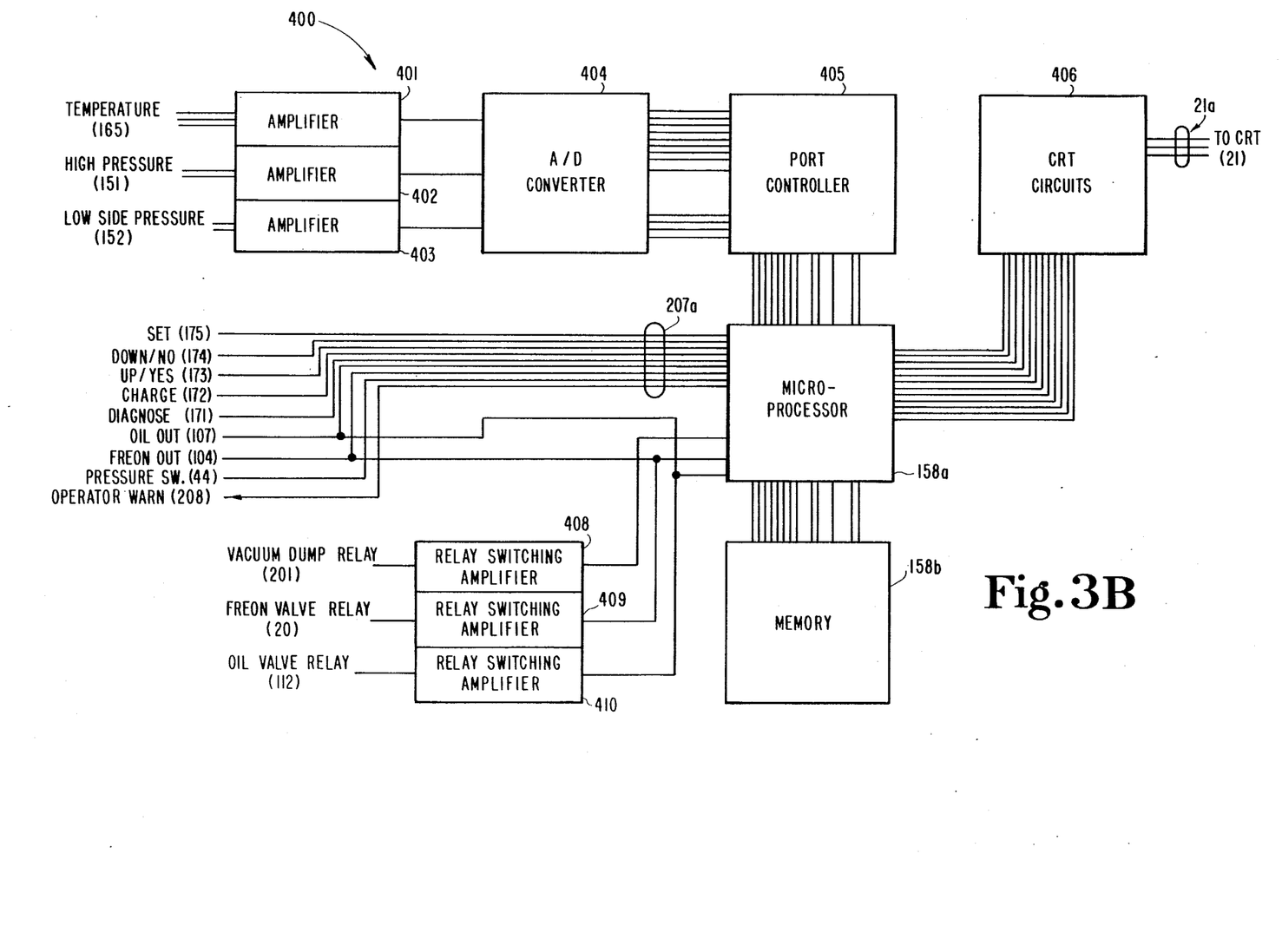
FIG. 3B is a block diagram of the electrical system of the service unit of FIG. 1 according to a presently preferred embodiment.

After the refrigerant tank has been replaced, the mechanic depresses a "SET" button 175 on cabinet 11 (see FIG. 4); and the microprocessor causes the system to resume the charging operation (see FIG. 3B).

The refrigerant tank 13 contains refrigerant which vaporizes under ambient atmospheric conditions, but which is stored under sufficient pressure to keep it liquefied. The refrigerant vapor pressure maintains pressure in the tank. The tank is mounted in an inverted position with its delivery outlet at the bottom so that the outlet will be under the pool of liquid in the tank with the pressurizing gas above the liquid. Refrigerant delivered to the line 60 will then be in a liquid state.

An oil supply line 106 leads from the pressurized oil supply tank 14 to the constant flow valve 64 and also contains a number of controls. Line 106 includes a check valve 108 which closes in the direction of flow toward the oil supply tank 14 to prevent back flow from the air-conditioning system or from the refrigerant supply system to the oil tank. The oil line 106 is connected to an oil solenoid valve 110 which is normally closed. Oil solenoid valve 110 is controlled by a relay 112 operated by an output signal of the microprocessor 158a as indicated in FIGS. 3A and 3B. Line 106 also contains an oil out pressure switch 107 which monitors the pressure in oil tank 14. When the pressure in tank 14 drops below a predetermined value, switch 107 actuates alarm 208 to signal the mechanic that oil tank 14 requires replacement and causes the microprocessor 158a to place an oil-charging operation in progress in a "hold" status. After replacement of the oil tank, the mechanic presses the "SET" button 175 to resume the charging operation. The line 40 leading from oil tank 14 to constant flow valve 64 also includes a flow indicator 114 mounted on the face of the cabinet 11 (see FIG. 1) to permit the mechanic to visually monitor the flow of oil and refrigerant to the air-conditioning system.

The oil tank is mounted in an inverted position so that its oil delivery outlet is at the bottom of the pool of oil in the tank and the pressurizing gas is at the top of the tank. The gas used is desirably nitrogen which does not dissolve in the oil. The gas pressure over the oil must be sufficient to force oil through the constant flow valve 64 and into the air-conditioning system when the oil solenoid valve 110 is opened under control of relay 112 and the microprocessor 158a. Sufficient pressurizing gas is used so that substantially all of the oil will be delivered before the pressure drops below the pressure at the suction side of the compressor and the oil tank loses its force. Desirably, however, excessively high gas pressures are not used to avoid introduction of nitrogen into the air-conditioning system. The flow indicator 114 is observable during oil charging so that if bubbles appear, the charging can be stopped and the oil tank replaced or refilled.

Line 46 connected to hose 17 also operates a pressure switch 44 which is responsive to the pressure on the low-pressure side of the air-conditioning system. If the pressure in the low-pressure side of system 30 exceeds a predetermined value, e.g., 56 psi, the system 10 is shut down because the pressure of tanks 13 and 14 may not be high enough for proper charging. Switch 44 also enables alarm 208 to signal the mechanic of the system inoperability. The mechanic is instructed to "START CAR" at this time.

When the pressure returns to an acceptable level (the low side pressure is pulled down by the operation of the compressor), the charging operation can be resumed.

Pressure switch 44 can be replaced by a suitable differential pressure switch 44a located as shown in dotted lines in FIG. 2. Differential pressure switch 44a reacts to the pressure drop across constant flow valve 64 and shuts down the system if the pressure drop is less than a predetermined value.

The float switch 104, the oil out switch 107, and the pressure switch 44 are all mounted within the cabinet 11. These switches are preferably semiconductor switches connected with the microprocessor as will be described in greater detail hereinafter.

The high-pressure section of the servicing apparatus comprises high-pressure hose 16 connected through a nipple 126 at the side of the cabinet 11 to a line 124. Hose 16 includes a normally closed check valve connector 16a, which is opened upon connection to the fitting of the air-conditioning system. Line 124 is openly connected through a line 132 to a high-pressure gauge 18 so that gauge 18 registers the pressure at the high-pressure port 41 at all times while the high-pressure hose is connected to the nipple 38 at of the air-conditioning system compressor 31. Line 124 is also connected through a manually operated dump valve 118 and to a collection tray 134 via line 164. When it is desired to empty the air-conditioning system, the valve 118, which is located on cabinet 11 as shown in FIG. 1, is opened. Tray 134 will collect liquid refrigerant and oil and allow the refrigerant to evaporate.

As shown in FIG. 2, the servicing apparatus of the present invention may also include a line 122 for an accessory supply of refrigerant, if desired.

The following procedures are generally followed with the apparatus of this invention in servicing automobile air-conditioning systems.

Initially, the hoses 16 and 17 are connected to the high and low sides of the compressor 31 by connecting them to valved nipples 38 and 37, respectively. The high and low sides of the compressor and of the air-conditioning system are thus connected to the apparatus and system of this invention. With this invention, the pressures are automatically measured; a diagnosis is made of the air-conditioning system; and instructions and information are communicated to the mechanic upon the appropriate steps to be carried out, using apparatus 10 to repair or test the system.

Under some circumstances, for example, when the air-conditioning system requires replacement of one of its elements, the system must first be emptied of pressurized refrigerant. For this purpose, the dump valve 118 is opened, which allows the pressurized contents of the system to escape through the high pressure hose 16, the dump valve 118, and line 164 to atmosphere and the collection tray 134. Oil is collected in the tray, and refrigerant evaporates.

After replacement of the necessary component of the air-conditioning system, and in certain other cases, the system should first be evacuated before being recharged. For this purpose, the relay 201 for the vacuum pump 12 is operated by the microprocessor 158a for a predetermined operating time which can be selected by the mechanic or by the microprocessor from the information stored in the data storage means 158b (FIG. 3B). Relay 201 energizes the vacuum pump 12 and opens the vacuum solenoid valve 52 so that the vacuum pump 12 evacuates the system through the low-pressure hose 17, the low-pressure line 46, and the vacuum line 42. At the end of the selected time, the relay 201 is closed by the microprocessor; and the vacuum solenoid valve 52; and the vacuum pump 12 are deenergized.

When the air-conditioning system has been sufficiently evacuated, it can then be charged with oil and refrigerant. Such charging is done at the suction side of the system. To charge the system with oil, oil relay 112 is operated by the microprocessor to energize the oil solenoid valve 110 in the oil line 106 for a predetermined time corresponding to the amount of oil desired to charge to the system. Under normal operating conditions, oil will flow through the constant flow valve 64 at a slow rate, for example, to deliver one ounce in forty-five seconds. The rate of flow is, however, dependent on the viscosity of the oil, which varies with ambient temperature. The microprocessor is supplied with ambient temperature by a temperature-measuring device 165 (FIGS. 3A and 3B) and automatically computes the operating time to ensure the system is properly charged with oil. Hence, if a normal charge of two ounces of oil is desired, solenoid 110 will maintain valve 108 open for a time, selected from the data stored in the system's data storage means 158b, that corresponds to two ounces of oil at the current ambient temperature. No temperature compensation is necessary by the mechanic. When the solenoid valve 110 opens, oil flows from the pressurized tank 14 through the line 106, the open oil solenoid valve 110, the check valve 108, and the flow indicator 114 to the constant flow valve 64, and through the constant flow valve 64 at a regulated rate, and thence to the low-pressure line 46 and hose 17. Because of the volume within the constant flow valve and the line 46 and the hose 17, the total charge of oil which passes through the constant flow valve 64 may not enter the compressor during the oil charging cycle. Oil remaining in the valve and lines will be propelled to the compressor by refrigerant flow through line 60, 60a to line 40 during the subsequent refrigerant charging step.

In the event the oil supply is depleted during the charging operation, the pressurizing nitrogen gas will begin to appear as bubbles in the flow indicator 114. The mechanic should then immediately stop the operation, as by throwing the master switch 27, and replace the depleted oil supply tank 14 with a full tank. In addition, oil out pressure switch 107 will be actuated to sound alarm 208 and cause the microprocessor to place the system on "hold" until the tank is replaced and the system restarted by pressing "SET" button 175.

To charge refrigerant, relay 70 will be operated by the microprocessor to cause solenoid valve 68 to open for a selected time. Under proper operating conditions, pressurized refrigerant flows from the refrigerant tank 13, through line 60, 60a and line 40 in liquid state through the constant flow valve 64 at a constant rate, such as one pound in each ninety seconds; and the refrigerant solenoid valve 68 will be opened by the microprocessor for a time to allow the desired charge of refrigerant to pass the constant flow valve 64 at the selected constant rate. In selecting the operating time, the microprocessor can consider the ambient temperature and make any compensation in operating time that may be necessary to ensure proper system charging. Thus, if two pounds of refrigerant are desired, for example, valve 68 is operated by the microprocessor for the correct time to charge the system with refrigerant. As the refrigerant passes through the flow valve 64 and thence to the low-pressure line 46 and low-pressure hose 17, it undergoes a substantial pressure drop and is changed from liquid to atomized or vapor state so that by the time it enters the operating compressor 31, it will be in atomized or vapor state to avoid damage to the compressor valves.

The refrigerant-charging system may also be used to add refrigerant to an air-conditioning system in servicing operations without first evacuating the entire system.

If the refrigerant in the pressurized refrigerant tank 13 becomes depleted during a refrigerant charging cycle, float switch assembly 104 is actuated as described above to sound alarm 208 and to cause the microprocessor 158a to put the system on "hold" so that the tank 13 can be replaced. Before allowing the charging to continue, the refrigerant-charging line 60, 60a and the low-pressure line 46 and the hose 17 should be purged of any air which might have entered during the tank-replacement operation. For this purpose, the fitting on the hose 17 at the low-pressure nipple 37 of the compressor should be loosened sufficiently to allow the hose 17 to bleed to atmosphere long enough to purge the lines. In practice, such bleeding is accomplished in about 30 seconds.

FIG. 3B is a block diagram of the electronic circuits 400. As shown in FIGS. 3A and 3B, the electronic circuit, the outputs of the temperature transducer 165, the high side pressure transducer 151, and the low side pressure transducer 152 are connected to DC amplifiers 401, 402, and 403 of the electronic circuits 400. DC amplifiers 401, 402, and 403 employ conventional, operational amplifiers and other circuits. The analog outputs of the three DC amplifiers are converted to digital representations of temperature, high side pressure, and low side pressure by an analog-to-digital computer 404 and directed through port controller 405 to microprocessor 158a. As also shown in FIG. 3B, the front panel switches 171, 172, 173, 174, and 175 and oil out switch 107, freon out switch 104, and the low side overpressure switch 44 are connected to the microprocessor 158a by cable 207a. The microprocessor also drives the operator signal 208 through cable 207a.

The microprocessor is, of course, connected with random access memory 158b, and the output of the microprocessor is connected with the cathode-ray tube control circuit 406. The display of the cathode-ray tube 21 is operated through cable 212 by the microprocessor 158a and the CRT circuits 406. The microprocessor 158a also operates relay switching amplifiers 408, 409, and 410 for the vacuum pump relay 201, freon valve relay 70, and oil valve relay 112, respectively. The electronic circuits indicated in FIG. 3B are not described in detail because they are well known to those skilled in the electronic arts and individually form to part of an invention.

In prior air-conditioning service units, before repairs could be carried out, the mechanic first decided if the air-conditioning system was operating improperly, made a diagnosis as to the nature of any malfunction, and finally decided how the malfunction should be corrected. These decisions were made by the mechanic by comparing the pressure readings on gauges 18 and 19 with the standards furnished by the manufacturer of the system being tested and, for example, by examining other observable characteristics and components of the air-conditioning system such as the sight glass 33 and the temperature of the air being discharged from the air-conditioning system.

Effective use of prior service units required substantial expertise on the part of the mechanic. Because there are a number of different air-conditioning systems in use, and because many mechanics service air-conditioning systems infrequently as one aspect of a general automotive repair capability, many mechanics simply do not possess the necessary experience to consistently diagnose and correct system malfunctions in an accurate manner which results in errors and inefficiencies in the repair process.

Although service manuals are available to assist the mechanic in making a diagnosis and in effecting repairs, the effective use of manuals is dependent upon the mechanic understanding their content and is time-consuming and frequently ineffective.

The above inadequacies and inefficiencies of prior servicing apparatus have been obviated by this invention which provides means for accurately and automatically measuring system pressures and ambient temperature, for diagnosing the condition of an air-conditioning system, for developing a list of possible malfunctions, for specifying the procedure to be followed to correct the malfunction, and for controlling system testing and recharging to effect repair of the system.

In accordance with the presently preferred embodiment, apparatus 10 includes a microprocessor and data storage means 158. The microprocessor 158a, which may be, for example, an Intel 8085, is programmed to analyze signals indicative of the high and low side pressures of the air-conditioning system, to retrieve data from the data storage means for the system being tested, and to produce outputs identifying possible causes of a system malfunction and specifying a servicing procedure to repair the system. The data storage means 158b is preferably an EPROM, for example, an Intel 2764.

As shown in FIG. 2, transducers 151 and 152 are connected to the high and low side pressure lines 124 and 46, respectively, and convert the pressures to analog electrical signals, which are proportional to the pressure readings on the gauges. These analog signals are received by the analog to digital converters 404 (FIG. 3B) which convert the analog signals to digital signals capable of being received by microprocessor 158a through input/output connections 202.

The microprocessor 158a is programmed to compare the values of the pressure signals from the analog to digital converter 404 with programmed standards for the type of air-conditioning system being tested that are stored in the data storage means 158b. With the results of the comparison, the microprocessor 158a then searches the data storage means 158b for comparable system operation and selects information from the data storage means 158b to produce an output on display 21 listing possible causes of a system malfunction and the appropriate procedure for repairing the system. The microprocessor 158a also controls leak-testing procedures and, if it is necessary to charge the air-conditioning system with refrigerant or oil, also ensures that the system will be properly charged with the desired amount regardless of temperature.

Figure 4:
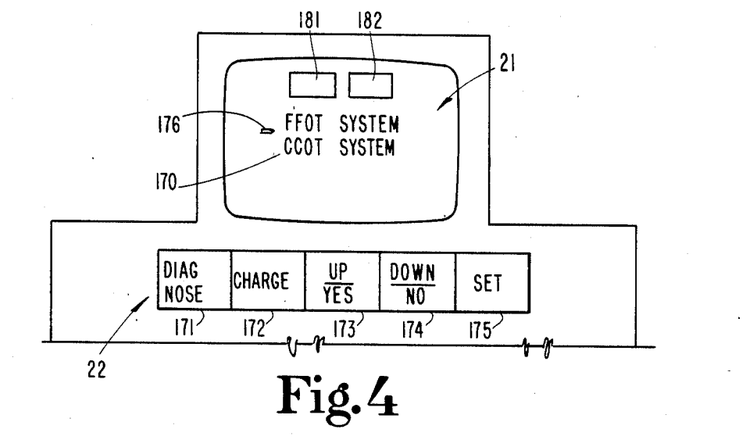
FIG. 4 illustrates the display screen and controls of FIG. 1 with the apparatus in the "system type selection" mode.

The manner in which the air-conditioning servicing apparatus 10 is used to test, diagnose, and repair an air-conditioning system will now be described. Reference is initially made to FIG. 4 which is an enlarged view of the upper portion of cabinet 11 and illustrates output 21 and controls 22 in greater detail.

As set forth above, to use apparatus 10, hoses 16 and 17 are connected to the high- and low-pressure sides of compressor 31; and on/off switch 27 is actuated to power the apparatus. Upon being energized, the microprocessor first enters into a "system selection" mode in which the mechanic identifies the particular type of air-conditioning system to be tested. In this mode, the screen of output 21 will display a menu listing the air conditioner types for which the microprocessor has been programmed. For example, as illustrated in FIG. 4, menu 170 will typically include the Ford Motor Company FFOT system, the General Motors CCOT system, as well as other systems that are likely to be serviced by the apparatus.

Identification of the system type is achieved by use of controls 22. As shown in FIG. 4, controls 22 comprise buttons 171, 172, 173, 174, and 175 which are designated "DIAGNOSE", "CHARGE", "UP/YES", "DOWN/NO", and "SET", respectively.

In the "system selection" mode, a cursor 176 appears on the screen which can be moved up or down by pressing buttons 173 or 174. When the cursor 176 has been aligned with the system type being tested, DIAGNOSE button 171 is pressed advising the microprocessor of the system type and initiating diagnosis of the system.

Figure 5:
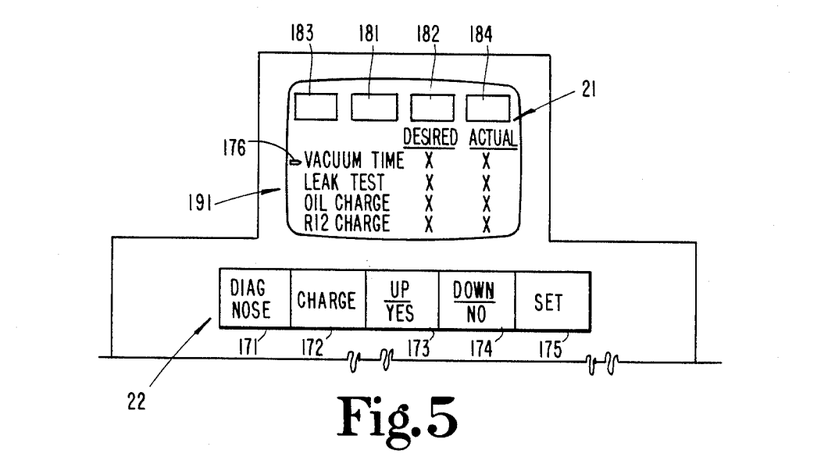
FIG. 5 illustrates the display screen and controls of FIG. 1 with the apparatus in the "charging" mode.

In the embodiment described herein, employing analog pressure gauges 18 and 19, the screen display also contains two rectangular displays 181 and 182 (FIG. 4) which preferably appear during all modes of operation of the microprocessor. These displays present, in real time, the ambient temperature and the test time respectively. From these displays and the readings on pressure gauges 18 and 19, the mechanic is continuously apprised of the status of the various operations being conducted and of the condition of the air-conditioning system. In an alternative embodiment, the analog pressure gauges 18 and 19 can be eliminated and the low and high side pressures can also be displayed in two additional rectangular displays 183 and 184, as shown in FIG. 5.

Upon pressing "DIAGNOSE" button 171, the microprocessor enters the "diagnose" mode; and the microprocessor will analyze the high and low side pressures of the air-conditioning system to determine whether or not the system is operating properly. If, from the analysis, the microprocessor determines that the system is not operating properly, a list of possible system malfunctions will be displayed by output 21. Because of the wide variance of such lists of system malfunctions and possible corrective actions, their presentation on the system CRT is not shown in the drawings (but see the specification below).

The microprocessor may also identify and display further tests that should be conducted to narrow the list of possible malfunctions and may ask questions which may be answered by the operator by pressing YES or NO buttons 173, or 174. For example, if both the high and low side pressures are too low, this could be indicative of several possible problems in the air-conditioning system, including a low R-12 charge, a restriction in the high side of the system, or an expansion valve that is stuck in the closed position. To narrow the list of possible malfunctions, the microprocessor might instruct the mechanic to perform additional tests such as checking the condition of the discharge air (i.e., is it warm or cool), the condition of the sight glass 33 (i.e., are bubbles or oil streaks present, etc.), or the condition of the expansion valve (i.e., is it sweating or is there a frost build-up). Such information and programs are stored in the data storage means 158b for each of the air-conditioning system types to be serviced.

Each question asked by the microprocessor can be answered in turn by the mechanic by depressing the appropriate "YES" or "NO" button, 173 or 174.

After the requested information has been furnished, the microprocessor will complete its diagnosis and present its conclusions on output screen 21. The diagnosis may include one or more possible causes of the system malfunction, and the screen will display the steps to be carried out by the mechanic to correct the problem in the most efficient manner. For example, low pressure in the high and low side of the system coupled with warm discharge air and oil streaks in the sight glass suggest that the air-conditioning system has a very low R-12 charge and that a leak may be present. In such a situation, the output screen 21 might display the following:

| GAUGE READINGS | Low Side Gauge | Low |
|---|---|---|
| | High Side Gauge | Low |
| OTHER SYMPTOMS | Discharge Air | Warm |
| | Sight Glass | Clear of Oil Streaks |
| | Compressor | Operation may have stopped if system is equipped with a refrigerant pressure sensing device. |
| DIAGNOSIS | System Very Low on R-12 | |
| | Possible Leak in System | |
| CORRECTION | (1) If compressor operation is stopped due to a pressure sensing device, by-pass device with jumper wire until testing and correction are complete. | |
| | (2) Add a partial refrigerant charge (to at least 50 percent system capacity), then make thorough leak test. | |
| | (3) Discharge refrigerant from system. | |
| | (4) Check compressor oil level. System may have lost oil due to leakage. | |
| | (5) Evacuate system using vacuum pump. | |
| | (6) Charge system with R-12. | |
| | (7) Operate system and check performance. | |

The mechanic is thus advised of the diagnosis and of the steps to take to repair the air-conditioning system. All that the mechanic needs to do is to follow the indicated instructions and to recheck the system for proper performance. He does not need independent knowledge of the many different air-conditioning systems, the nature of the problems of such air-conditioning system, nor the procedures for testing, diagnosing, and repairing the many different systems, nor must he consult any operating manuals or other reference sources to repair such systems. The apparatus thus permits efficient and reliable repair of air-conditioning systems with minimal knowledge and guesswork by the mechanic, permitting those who may be less than expert in repairing air-conditioning systems to be as effective as those possessing greater expertise.

Diagnosis is made by the apparatus while the air-conditioning system is operating under appropriate conditions, and a typical diagnosis will take about but a few minutes.

Furthermore, the apparatus of the present invention assists the mechanic in charging the air-conditioning system with refrigerant or oil when these steps are required during servicing of the system. Specifically, the microprocessor is also programmed for a third "Charging" mode of operation during which the air-conditioning system can be evacuated, charged with refrigerant and oil, and a leak test performed. During this mode, output screen 21 will contain display 191 illustrated in FIG. 5.

The mechanic sets the desired times for the application of a vacuum to evacuate the system, the desired amounts of refrigerant and/or oil, and the time that the leak test is to be run by aligning cursor 176 with the appropriate activity using UP or DOWN button 173 or 174 and then by setting the desired time and amounts using SET button 175. Such information may be displayed from data storage means 158b. If evacuation is called for, the microprocessor will operate the relay 201 to actuate solenoid 52 (FIGS. 3A and 3B) for the desired time; and evacuation will be carried out as described previously.

To charge the system with refrigerant or oil after the desired amounts have been entered, CHARGE button 172 is pressed. The microprocessor will operate relays 70 and/or 112 to automatically effect charging for the period of time need to correctly charge the system. To test the system for leaks, the cursor is aligned with the leak test line; the desired time is set; and the display and the gauges will automatically monitor the system for the selected period of time to determine if a leak is present. During all of these activities, the running or actual time elapsed will be displayed on the screen for the information of the mechanic.

Figure 8:
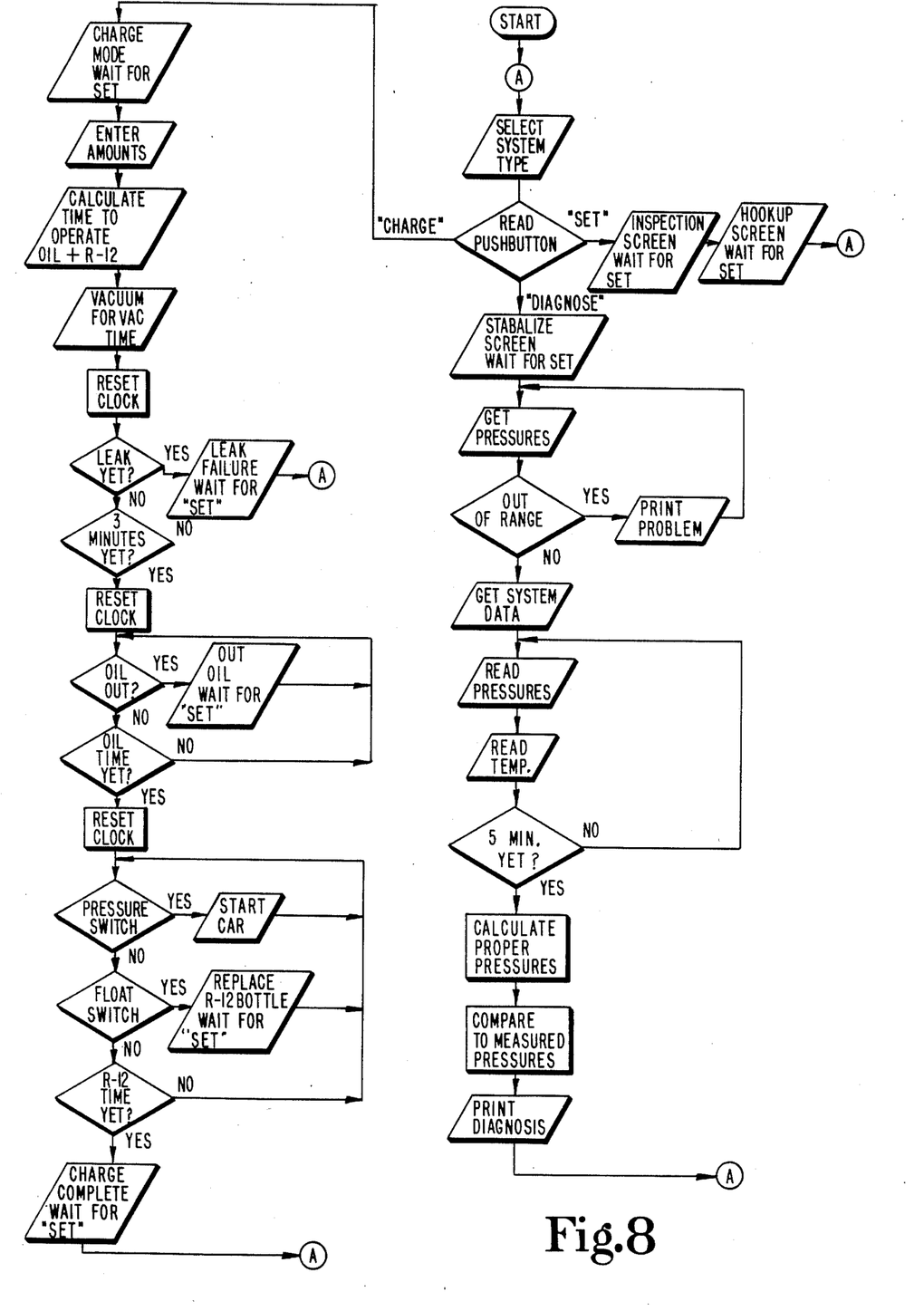
FIG. 8 is a flow chart illustrating the program stored in the microprocessor and data storage means according to a presently preferred embodiment of the invention.

FIG. 8 is a flow chart illustrating the program stored in the microprocessor data storage means 158 according to a presently preferred embodiment of the invention.

During the operation of the apparatus 10 to charge an air-conditioning system with refrigerant or oil, the refrigerant and oil flows through a constant flow valve 64 (FIG. 2) before flowing into the air-conditioning system. A suitable constant flow valve is described in detail in U.S. Pat. No. 3,873,289 and includes structure for maintaining a constant flow of fluid through the valve regardless of pressure variations across the valve as a whole.

Figure 6:
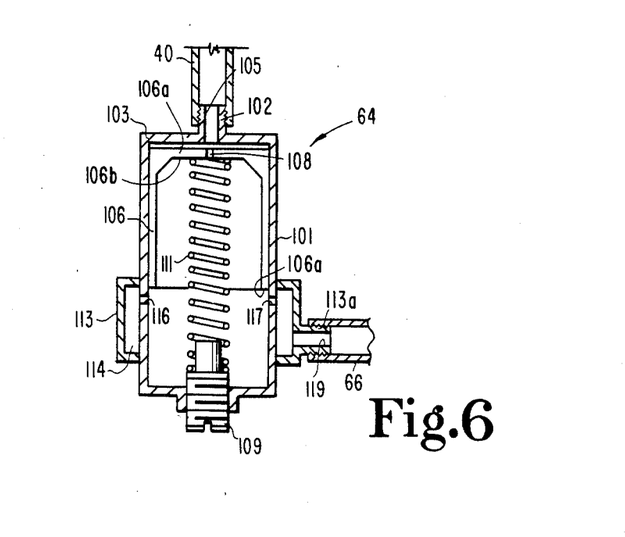
FIG. 6 is a cross-sectional view of a constant flow valve incorporated into the apparatus of the present invention.

An enlarged sectional view of pressure-regulated, constant flow valve 64 is shown in FIG. 6. The valve comprises a hollow cylindrical housing 101 having an inlet connector nipple 102 in its end 103, defining an opening 105 extending into the hollow interior of the housing 101. A piston 106 is slidably received within the housing 101 and comprises a cylindrical sidewall and an end wall 106a having a small orifice 108 adjacent the connector nipple 102. The piston is open at its bottom end. A solid core flow adjuster 109 is threaded into the lower end of the housing 101, and a spring 111 is mounted about the core 109. The spring 111 bears against the upper end wall 106b of the piston 106 so as to urge the piston toward the end wall 103 of the housing 101.

A cylindrical collar 113 is mounted about the lower end of the housing 101 and defines an open chamber 114 which extends circumferentially about the housing. The chamber 114 communicates with the hollow interior of the housing 101 through a pair of diametrically opposed restricted orifices 116 and 117 which are drilled in housing just below the bottom edge 106a of the piston 106. An outlet connector nipple 113a is mounted on the cylindrical collar 113 and defines an outlet opening 119 from the interior of the collar. The nipple 113a is connected to the short tube 66 leading to the four-way fitting 66a, as shown in FIG. 2.

In operation of the constant flow valve 64, liquid flows under pressure from the supply line 60, 60a through line 40 to the inlet nipple 102. In the constant flow valve 64, the liquid passes through the small orifice 108 in the end wall of the piston 106 and into the hollow interior of the piston. It then passes through the opposed orifices 116 and 117 and into the circumferential chamber 114. From there, fluid (refrigerant is atomized as it passes through the valve) passes out of the valve 64 through the outlet nipple 113a through lines 66 and 46 and thence to the low pressure line 17.

The flow of liquid through the small orifice 108 creates a pressure drop across the piston which urges the piston downwardly as viewed in FIG. 6 and against the spring 111. As the piston moves downward, the bottom edge 106a of its sidewall partially closes the diametrically opposed orifices 116 and 117 and reduces the flow rate through those orifices. Such closing creates back-pressure to reduce the pressure drop across the orifice 108. Downward movement of the piston due to the liquid flow is opposed by the spring 111 which urges the piston upward in a direction to open the orifices 116 and 117. The action of the piston 106 maintains a substantially constant flow rate through the valve 64 regardless of pressure variations across the valve as a whole. The quantity of fluid that is delivered through the valve 64 and into the air conditioner system 30 is therefore a direct function of time and can be accurately controlled by the microprocessor operating solenoid valves 68 and 110.

The actual flow rate through the valve 64 is dependent upon the pressure exerted by the spring 111 which can be adjusted by threading flow adjuster 109 into and out of housing 101. It is also dependent on the viscosity of the liquid passing through the valve. The oil viscosity, in particular, is highly dependent on the temperature of the oil; and variations in the oil temperature can significantly affect its actual flow rate into the air-conditioning system.

In prior systems, it was necessary for the mechanic to measure ambient temperature and to compensate for variations in the flow rate caused by variations in the oil temperature by adjusting a timer to adjust charging time to ensure that the system was filled with the desired quantity of oil. In the present invention, the mechanic need only set the desired amounts of oil and refrigerant which are selected by the microprocessor from the stored data and displayed on the CRT; and the microprocessor will automatically adjust the time of operation of solenoid valves 68 and 110 to compensate for variations in the viscosity of the oil caused by temperature.

Figure 7:
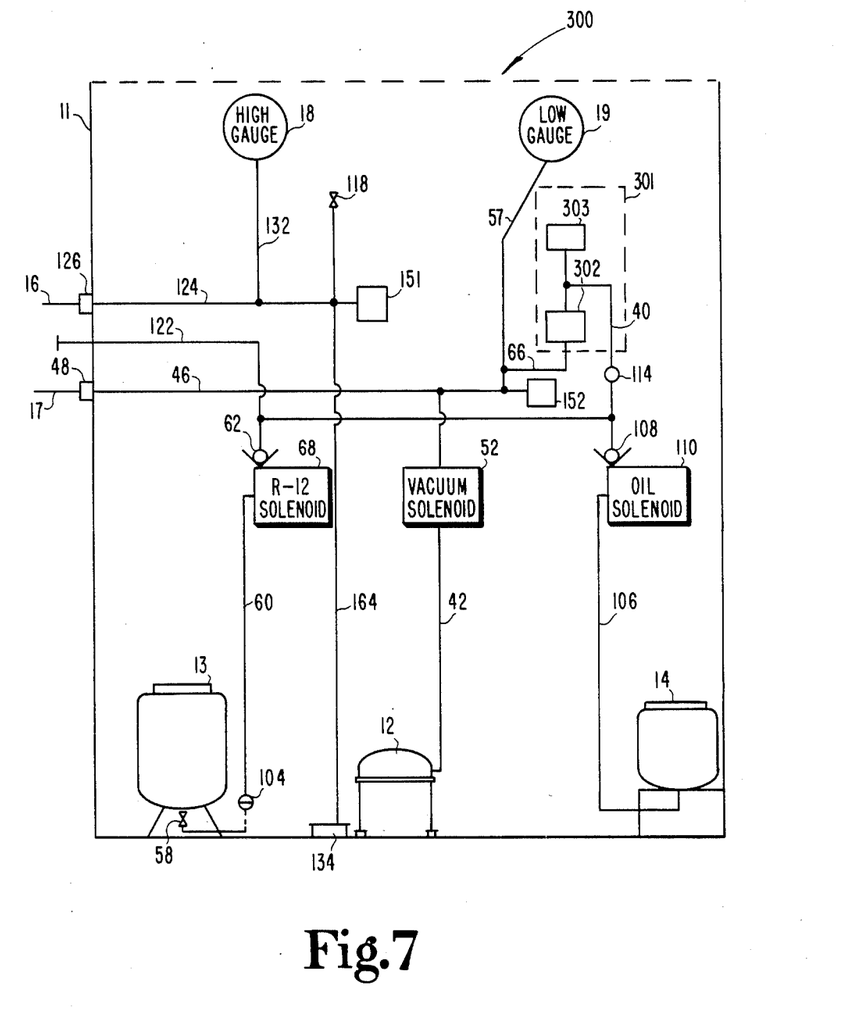
FIG. 7 schematically illustrates a plumbing diagram of the service unit of FIG. 1 according to an alternative embodiment of the invention.

FIG. 7 illustrates a plumbing diagram of the service unit 300 according an alternative embodiment of the invention. Service unit 300 is similar to service unit 10 shown in FIG. 2 except that the constant flow valve 64 has been replaced by an electronic flow meter 301 which includes a fixed orifice 302 and another pressure transducer 303. The electronic flow meter is based on the principle that the flow of liquid through an orifice is directly related to the pressure drop across it. The pressures on either side of the orifice are measured and assumed constant for a plurality of short time intervals, T. During these time intervals, the difference between the pressures (measured by transducer 303) is used to calculate the flow rate of either oil or R-12 for that short time interval T. The amount of oil or R-12 that is passing through the orifice during the short time interval T is subtracted by the microprocessor 158a from the total amount to be charged which has been stored in the memory 158a, and this cycle then repeats until zero is reached. The speed at which the microprocessor can make all these calculations makes it possible to keep the time interval T to a minimum, therefore increasing the accuracy of the measurement.

The electronic flow meter may also eliminate the need for the pressure switch 44 and the oil out pressure switch 107 of FIG. 2 (as can be determined by its comparison with FIG. 7).

While what has been described constitutes a presently preferred embodiment, it should be recognized that the invention can take many other forms. Accordingly, it should be understood that the invention should be limited only insofar as is required by the scope of the following claims.

We claim:

1. A method for servicing air-conditioning systems, comprising:
    measuring the high and low side pressures of an air-conditioning system;
    converting said measured pressures to electrical signals corresponding to said measured pressures;
    analyzing said electrical signals by comparing said electrical signals to electrical signals provided by a data-storage means corresponding to standard pressure values for proper functioning of said system;
    providing an output indicating whether said air-conditioning system is functioning properly;
    providing an output if said system is not functioning properly indicating one or more possible causes of malfunction of the system; and
    providing an output indicating the procedure to be followed by the operator to effect repair of said system if said system is not functioning properly.

2. The method of claim 1 and further including the step of providing the data storage means with electrical signals corresponding to standard pressure values for proper functioning of a plurality of air conditioning systems and the procedures to be followed by the operator to effect repairs of each air conditioning system if a system is not functioning properly, and identifying the type of air-conditioning system being serviced and wherein said analyzing step includes the step of comparing said electrical signals with signals representing standard values for the particular type of air-conditioning system being serviced.

3. The method of claim 1 wherein said converting step includes the steps of converting said measured pressures to analog electrical signals corresponding to said measured pressures, and converting said analog electrical signals to digital electrical signals with said electrical signals being received by electronic processing means.

4. The method of claim 1 wherein said servicing includes the further steps of:
    determining the amount of fluid such as oil and refrigerant needed to charge the air-conditioning system;
    supplying the needed fluid to the air-conditioning system through a fixed orifice;
    measuring the fluid pressure on each side of the fixed orifice during a plurality of intervals of time;
    determining from said measured pressures the flow rate through the orifice during each short interval of time and the total flow through the orifice in each short interval of time; and
    subtracting the total flow through the orifice in each short interval of time from the amount of fluid needed to charge the air-conditioning system until a zero quantity is reached and terminating the fluid supply.

5. The method of claim 1 wherein said servicing includes the further steps of:
    measuring the ambient atmospheric temperature;
    determining the amount of fluids such as oil and refrigerant needed to charge the air-conditioning system; and
    supplying the needed fluid to the air-conditioning at a constant rate of flow through a valve operated for a time duration automatically determined by said system from said ambient atmospheric temperature measurement.

6. Apparatus for servicing air-conditioning systems, comprising:
    means for measuring the high and low side pressure of an air-conditioning system;
    means for converting said high and low side measured pressures to electrical signals corresponding to said measured pressures;
    electronic processing means for receiving said electrical signals and for comparing said electrical signals with data representing standard values for the proper functioning of said air-conditioning system; and
    output means connected to said electronic processing means for providing an output indicating whether said system is functioning properly and if said system is not functioning properly, for indicating possible causes of the malfunction and the procedure to be followed by the operator to effect repair of said system.

7. The apparatus of claim 6 wherein said converting means includes transducer means coupled to said pressure-measuring means for converting said high and low side pressure measurements to analog electrical signals corresponding to said measured pressures, and analog-to-digital converter means for converting said analog signals to digital signals with said electrical signals being received by said electronic processing means.

8. The apparatus of claim 7 wherein said electronic processing means comprises a microprocessor.

9. The apparatus of claim 8 wherein said means for charging said system with refrigerant and with oil includes a fixed orifice and means to measure the pressure on each side of the fixed orifice, valve means to operate said refrigerant and oil-charging means, and said electronic processing means includes means for operating said valve means, and means for generating a plurality of short time intervals during operation of the refrigerant and oil-charging means, means for calculating the rate of flow of refrigerant and oil and total flow of refrigerant and oil through the small orifice in each of the plurality of short time intervals and for subtracting the total flow of refrigerant and oil during each of the short time intervals from an amount of refrigerant and oil predetermined by said electronic processing means to properly charge the air-conditioning system until zero is reached and then terminating operation of said valve means.

10. The apparatus of claim 7 wherein said output means comprises CRT output means.

11. Apparatus for servicing automotive air-conditioning systems, said apparatus including means for measuring the high and low side pressures of said air-conditioning system, means for charging said system with refrigerant, and means for charging said system with oil; the improvement comprising electronic processing means connected to said pressure-measuring means for analyzing said measured high and low side pressures and for diagnosing the condition of said air-conditioning system as a function of said measured high and low side pressure, and output means coupled to said electronic processing means for outputting said diagnosis, indicating one or more possible causes of the malfunction and the procesure to be followed by the operator to effect repair of said system.

12. The apparatus of claim 11 and further including means for coupling said electronic processing means to said pressure-measuring means, said coupling means including means for converting said pressure measurements to electrical signals with said electrical signals being received by said electronic processing means.

13. The apparatus of claim 12 and further including a housing for supporting said apparatus.

14. The apparatus of claim 12 wherein said means for charging said system with refrigerant and with oil includes fluid flow control means for maintaining a constant flow of refrigerant and oil into said air-conditioning system, valve means for controlling the flow of refrigerant and oil, and wherein said electronic processing means operates said valve means to provide a predetermined quantity of said refrigerant and oil to said air-conditioning system irrespective of variations in ambient temperature.

15. The apparatus of claim 14 and further including temperature-monitoring means for monitoring the temperature of said refrigerant and oil, said electronic processing means being responsive to changes in the temperature of said refrigerant and oil for adjusting the operating time of said valve means to obtain a predetermined amount of oil therethrough.

16. In apparatus for servicing automotive air-conditioning systems, said apparatus including means for measuring the high and low side pressures of said air-conditioning system, means for charging said system with refrigerant, and means for charging said system with refrigerant and oil; and microprocessor means, the improvement wherein said means for charging said system with refrigerant and with oil includes a fixed orifice and means to measure the pressure on each side of the fixed orifice, valve means to operate said refrigerant and oil-charging means, and said microprocessor means includes means for operating said valve means, and means for generating a plurality of short time intervals during operation of the refrigerant and oil-charging means, means for calculating the rate of flow of refrigerant and oil and the total flow of refrigerant and oil through the small orifice in each of the plurality of short time intervals and for subtracting the total flow of refrigerant and oil during each of the short time intervals from an amount of refrigerant and oil predetermined by said microprocessor means to properly charge the air-conditioning system until zero is reached and then terminating operation of said valve means.

17. A method of recharging an air-conditioning system, comprising:
  determining the amount of oil or refrigerant to charge the air-conditioning system;
  supplying oil or refrigerant to the air-conditioning system through a fixed orifice;
  measuring the oil or refrigerant pressure on each side of the fixed orifice during a plurality of intervals of time;
  determining from said measured pressures the flow rate of oil or refrigerant through the orifice during each short interval of time and the total flow of oil or refrigerant through the orifice in each short interval of time; and
  subtracting the total flow of oil or refrigerant through the orifice in each short interval of time from the amount of oil or refrigerant, respectively, needed to charge the air-conditioning system until a zero quantity is reached and terminating the oil supply.

18. An apparatus for servicing one of a plurality of different automotive air-conditioning systems, comprising:
  a cabinet,
  said cabinet including
  first and second means for measuring the high and low side pressures, respectively, of said automotive air-conditioning systems;
  an oil storage means;
  refrigerant storage means;
  fluid-delivery means coupled to said refrigerant and said oil storage means for charging said systems with refrigerant and oil from said refrigerant and oil storage means, respectively;
  means for evacuating said systems;
  means for connecting said first and second pressure-measuring means, said charging means and said evacuating means to said air-conditioning systems;
  a microprocessor;
  means for entering information and said high and low side pressures into said microprocessor, said microprocessor providing means to analyze said information and high and low side pressures, to compare said high and low side pressure values with standard values provided by a data-storage means representing proper functioning of said system and to analyze said information and comparison and determine possible causes of malfunctions of a connected air conditioning system and a procedure to effect its repair; and
  output means connected to said microprocessor for indicating whether said system is functioning properly and, if not, for indicating possible causes of a system malfunction and the procedure to be followed by the operator to effect repair of said system.

19. The apparatus of claim 18 and further including means coupled to said microprocessor for monitoring the temperature of said oil in said oil storage means, said fluid-delivery means maintaining a constant flow of oil through said fluid-delivery means, said microprocessor providing means to determine the operating time of the fluid delivery means to provide a predetermined quantity of oil irrespective of variations in the viscosity of said oil due to variations in the temperature thereof.

20. The apparatus of claim 18 and further including means for monitoring the level of refrigerant in said refrigerant storage means and for producing a signal when the level of refrigerant in said refrigerant storage means drops below a predetermined level, said microprocessor being responsive to said signal for placing said apparatus on "hold" to prevent further charging of said air-conditioning system without a proper amount of refrigerant available.

21. The apparatus of claim 20 and further including an alarm, said refrigerant-monitoring means including means for actuating said alarm when the level of refrigerant in said refrigerant storage means drops below said predetermined level to signal the operator.

22. The apparatus of claim 20 wherein said refrigerant-monitoring means includes switch means responsive to the level of refrigerant in said refrigerant storage means, a light source enabled by said switch means when the level of refrigerant drops below said predetermined level, a photodetector for detecting light from said light source and for producing said signal.

23. The apparatus of claim 22 and further including an alarm, said oil out pressure switch means including means for actuating said alarm when the level of oil in said oil storage means drops below said predetermined level to signal the operator.

24. The apparatus of claim 18 and further including oil out pressure switch means for monitoring the pressure in said oil storage means and for generating a signal when the oil in said oil storage means drops below a predetermined level, said microprocessor being responsive to said signal for placing said apparatus on "hold" to prevent further charging of said air-conditioning system without a proper amount of oil available.

25. The apparatus of claim 18 and further including pressure switch means for monitoring the pressure in the low side of said air-conditioning system and means for coupling said pressure switch means to said microprocessor for shutting down said apparatus when the pressure in said low side exceeds a predetermined value.

26. The apparatus of claim 18 and further including a flow valve for maintaining a constant flow of refrigerant or oil into said air-conditioning system, a differential pressure switch for measuring the pressure drop across said flow valve, and means for coupling said differential pressure switch to said microprocessor for shutting down said apparatus when the pressure drop is less than a predetermined value.

27. The apparatus of claim 18 wherein said fluid delivery means includes a fixed orifice and means to measure the pressure on each side of the fixed orifice and provide such measurements to said microprocessor and said microprocessor provides means for generating a plurality of short time intervals and for determining the flow rate and total flow through the fixed orifice in each of the plurality of short time intervals and for subtracting the total flow through the fixed orifices in each of the plurality of short time intervals from a predetermined quantity of oil or refrigerant until a zero quantity is reached and then terminating operation of said fluid delivery means.

* * * * *

UNITED STATES PATENT AND TRADEMARK OFFICE
CERTIFICATE OF CORRECTION

PATENT NO. : 4,755,957

DATED : JULY 5, 1988

INVENTOR(S) : DANIEL WHITE and JOHN HANCOCK

It is certified that error appears in the above-identified patent and that said Letters Patent is hereby corrected as shown below:

In "[73] Assignee:", delete "K-White Tools, Incorporated" and insert -- K-Whit Tools, Incorporated -- therefor.

In "[21] Appl. No.:", delete "884,541 and insert -- 844,541 -- therefor.

In col. 4, line 2, delete "selfcontained" and insert -- self-contained -- therefor.

In col. 7, line 42, delete "at".

In col. 13, line 39, delete "need" and insert -- needed -- therefor.

In col. 14, line 11, after "in" and insert -- the -- therefor.

In col. 17, line 30 (claim 11, line 14), delete "procesure" and insert -- procedure -- therefor.

In col. 17, line 57 (claim 16, line 1), delete "In" and insert -- An -- therefor.

UNITED STATES PATENT AND TRADEMARK OFFICE
CERTIFICATE OF CORRECTION

PATENT NO. : 4,755,957

DATED : JULY 5, 1988

INVENTOR(S) : DANIEL WHITE and JOHN HANCOCK

It is certified that error appears in the above-identified patent and that said Letters Patent is hereby corrected as shown below:

```
      In col. 20, line 30 (claim 27, line 9, delete
"orifices" and insert -- orifice -- therefor.
```

Signed and Sealed this

Third Day of January, 1989

Attest:

DONALD J. QUIGG

*Attesting Officer*  *Commissioner of Patents and Trademarks*